United States Patent
Wang et al.

(10) Patent No.: US 11,577,199 B2
(45) Date of Patent: Feb. 14, 2023

(54) METHOD FOR DESULPHURIZATING AND DENITRATING FLUE GAS IN INTEGRATED MANNER BASED ON LOW-TEMPERATURE ADSORPTION

(71) Applicants: CHINA HUANENG GROUP CO., LTD, Beijing (CN); HUANENG CLEAN ENERGY RESEARCH INSTITUTE, Beijing (CN)

(72) Inventors: Shiqing Wang, Beijing (CN); Shisen Xu, Beijing (CN); Shiwang Gao, Beijing (CN); He Zhao, Beijing (CN); Minhua Jiang, Beijing (CN); Ping Xiao, Beijing (CN); Bin Huang, Beijing (CN); Hongwei Niu, Beijing (CN); Jinyi Wang, Beijing (CN); Lianbo Liu, Beijing (CN); Dongfang Guo, Beijing (CN)

(73) Assignees: CHINA HUANENG GROUP CO., LTD, Beijing (CN); HUANENG CLEAN ENERGY RESEARCH INSTITUTE, Beijing (CN)

(*) Notice: Subject to any disclaimer, the term of this patent is extended or adjusted under 35 U.S.C. 154(b) by 0 days.

(21) Appl. No.: 17/501,770

(22) Filed: Oct. 14, 2021

(65) Prior Publication Data
US 2022/0040634 A1   Feb. 10, 2022

Related U.S. Application Data

(63) Continuation of application No. PCT/CN2020/126259, filed on Nov. 3, 2020.

(30) Foreign Application Priority Data

May 18, 2020 (CN) .......................... 202010420533.0

(51) Int. Cl.
*B01D 53/26* (2006.01)
*B01D 53/50* (2006.01)
(Continued)

(52) U.S. Cl.
CPC .......... *B01D 53/81* (2013.01); *B01D 53/265* (2013.01); *B01D 53/508* (2013.01);
(Continued)

(58) Field of Classification Search
CPC .... B01D 53/81; B01D 53/265; B01D 53/508; B01D 53/565; B01D 53/96;
(Continued)

(56) References Cited

U.S. PATENT DOCUMENTS

2009/0148371 A1* 6/2009 Reddy ................ B01D 53/1456
95/228

FOREIGN PATENT DOCUMENTS

| CN | 101805804 | 8/2010 |
| CN | 106422646 | 2/2017 |

(Continued)

OTHER PUBLICATIONS

CNIPA, First Office Action for CN Application No. 202010420533.0, dated Feb. 8, 2021.
(Continued)

*Primary Examiner* — Timothy C Vanoy
(74) *Attorney, Agent, or Firm* — Hodgson Russ LLP

(57) ABSTRACT

Provided is a method for desulphurizating and denitrating a flue gas in an integrated manner based on low-temperature adsorption. The method includes: decreasing a temperature of the flue gas below a room temperature by using a flue gas cooling system; removing moisture in the flue gas by using a dehumidification system; sending the flue gas to a $SO_2$ and $NO_x$ adsorbing column system; and simultaneously adsorbing $SO_2$ and $NO_x$ of the flue gas with a material of activated (Continued)

coke, activated carbon, a molecular sieve or diatom mud in the $SO_2$ and $NO_x$ adsorbing column system to implement an integration of desulphurization and denitration of the flue gas based on the low-temperature adsorption. With the present method, $SO_2$ and $NO_x$ of the flue gas can be adsorbed simultaneously in an environment having a temperature below the room temperature.

6 Claims, 2 Drawing Sheets

(51) Int. Cl.
    *B01D 53/56*         (2006.01)
    *B01D 53/81*         (2006.01)
    *B01D 53/96*         (2006.01)

(52) U.S. Cl.
    CPC ........... *B01D 53/565* (2013.01); *B01D 53/96* (2013.01); *B01D 2253/102* (2013.01); *B01D 2253/116* (2013.01); *B01D 2257/302* (2013.01); *B01D 2257/404* (2013.01)

(58) Field of Classification Search
    CPC ........ B01D 2253/102; B01D 2253/116; B01D 2257/302; B01D 2257/404; B01D 53/02; B01D 53/60; B01D 2253/00; B01D 2258/0283

See application file for complete search history.

(56) References Cited

FOREIGN PATENT DOCUMENTS

| | | | | |
|---|---|---|---|---|
| CN | 107126811 | | 9/2017 | |
| CN | 109 173 570 A | * | 1/2019 | ............ F27D 17/00 |
| CN | 109806740 | | 5/2019 | |
| CN | 110743312 | | 2/2020 | |
| CN | 110743313 | | 2/2020 | |
| WO | WO 99 02 243 A1 | * | 1/1999 | ............ B01D 53/04 |
| WO | WO 2015 176 101 A1 | * | 11/2015 | ............ B01J 23/70 |

OTHER PUBLICATIONS

WIPO, International Search Report and Written Opinion for International Application No. PCT/CN2020/126259, dated Feb. 20, 2021.

* cited by examiner

METHOD FOR DESULPHURIZATING AND DENITRATING FLUE GAS IN INTEGRATED MANNER BASED ON LOW-TEMPERATURE ADSORPTION

CROSS-REFERENCE TO RELATED APPLICATIONS

This application is a continuation of the International Patent Application No. PCT/CN2020/126259, filed Nov. 3, 2021, which claims priority to and benefits of Chinese Patent Application Serial No. 202010420533.0, filed on May 18, 2020, the entire contents of which are incorporated herein by reference.

FIELD

The present disclosure relates to a field of integrated desulphurization and denitration technology for a flue gas, and more particularly to a method for desulphurizating and denitrating a flue gas in an integrated manner based on low-temperature adsorption.

BACKGROUND

In current desulphurization and denitration technologies, a selective catalytic reduction (SCR) denitration and a flue gas desulphurization (FGD) are usually used. The SCR denitration refers to that $NO_x$ is reduced to $N_2$ by a catalyst and a reductant, and a product is discharged. A limestone-gypsum method may be used for desulphurization. In this case, $SO_2$ is reacted with a limestone slurry to produce insoluble calcium sulfate (gypsum), which is further removed. The traditional SCR denitration and FGD desulphurization technologies are widely applied, but still have a number of problems. For example, for the FGD desulfurization a large amount of limestone used as a desulphurizer is consumed, requiring massive mining of the limestone, which causes serious mountain damage. For a power plant, the FGD desulphurization produces a large amount of wastewater, which is difficult to be processed. Since the catalyst used in the SCR denitration only has a high activity in a specific temperature range, a change to temperature of the flue gas (which may happen when operating loads of the power plant is adjusted) shall seriously affect the SCR denitration efficiency. In addition, the SCR denitration also causes secondary pollution problems such as ammonia slip and solid waste of catalysts.

Therefore, there is still a need to develop a method that may achieve simultaneous adsorption of $SO_2$ and $NO_x$ of the flue gas in an environment having a temperature lower than the room temperature.

SUMMARY

Embodiments of the present disclosure seek to solve at least one of the problems existing in the related art. Accordingly, an object of the present disclosure is to provide a method for desulphurizating and denitrating a flue gas in an integrated manner based on low-temperature adsorption.

In order to achieve the above-mentioned object, the method for desulphurizating and denitrating the flue gas in the integrated manner based on the low-temperature adsorption is provided in the present disclosure. The method includes: decreasing a temperature of the flue gas below a room temperature by using a flue gas cooling system; removing moisture in the flue gas by using a dehumidification system; sending the flue gas to a $SO_2$ and $NO_x$ adsorbing column system; and simultaneously adsorbing $SO_2$ and $NO_x$ of the flue gas with a material of activated coke, activated carbon, a molecular sieve or diatom mud in the $SO_2$ and $NO_x$ adsorbing column system to implement an integration of desulphurization and denitration of the flue gas based on the low-temperature adsorption.

REFERENCE NUMERALS

Figure 1:
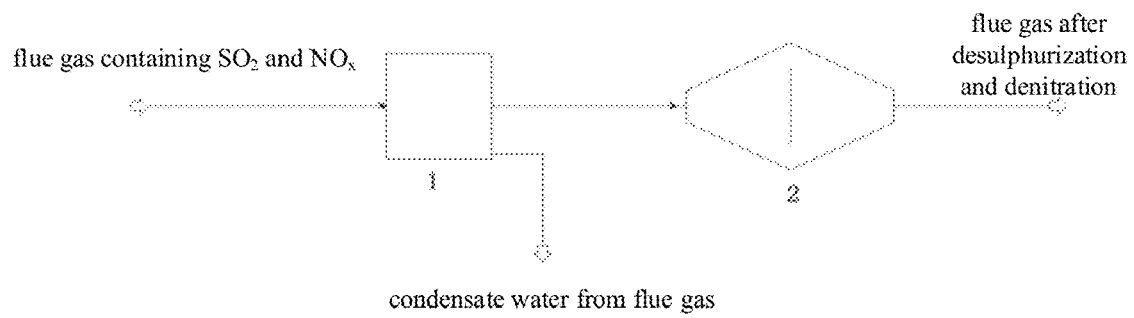
FIG. 1 is a schematic diagram showing a process according to the present disclosure.
Figure 2:
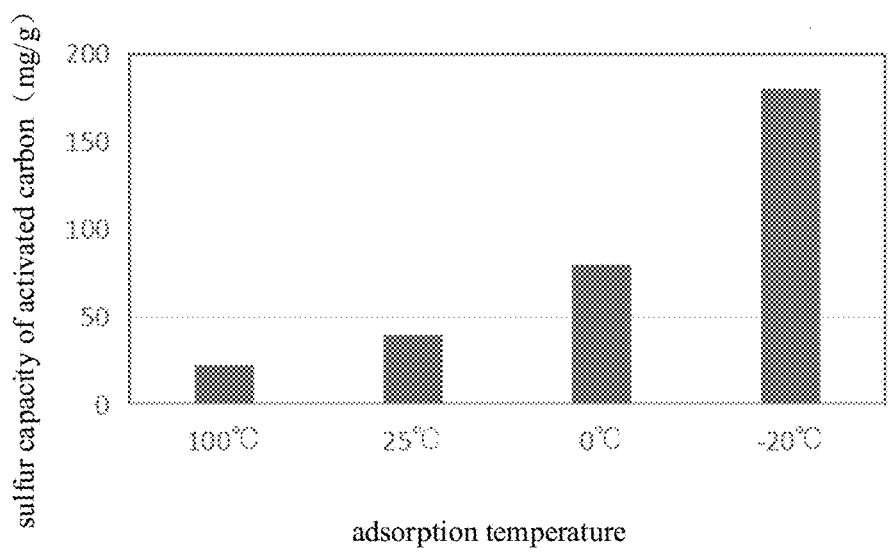
FIG. 2 is a graph showing a relationship between a sulfur capacity of activated carbon and an adsorption temperature at a $SO_2$ concentration of 3000 $mg/Nm^3$.
Figure 3:
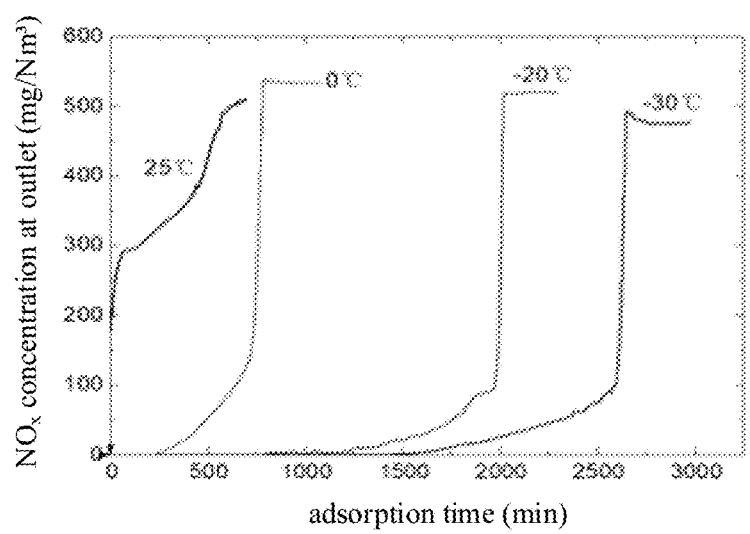
FIG. 3 is a graph showing a penetration time of $NO_x$ adsorption of activated carbon at a $NO_x$ concentration of 500 $mg/Nm^3$.

1: flue gas cooling system; 2: $SO_2$ and $NO_x$ adsorbing column system.

DETAILED DESCRIPTION

The following is the detailed description of the present disclosure in combination with the drawings.

An existing integrated desulphurization and denitration technology is industrially applied based on activated coke adsorption. This technology refers to that $SO_2$ is adsorbed and thus removed due to porous adsorption characteristics of activated coke. However, the activated coke adsorption process cannot adsorb and remove $NO_x$, since it is difficult for NO to be adsorbed. In this technology, it still needs to reduce $NO_x$ into $N_2$ by spraying ammonia to the gas, and activated coke is used as a selective reduction catalyst. By using activated coke, a denitration rate is relatively low and to be from about 70% to 80%, which cannot meet a requirement of ultra-clean emissions. In addition, since the activated coke dry desulphurization is based on $H_2SO_4$ chemical adsorption, a regeneration temperature is high. Activated coke participates in the regeneration reaction, which causes a large loss.

A process of activated coke (carbon) dry desulfurization is as follows.

Adsorption reaction: $SO_2+H_2O+1/2O_2=H_2SO_4$

Heating regeneration reaction:

a reaction at 350° C. to 450° C.: $H_2SO_4+C \rightarrow CO_2+2SO_2+2H_2O$ a reaction above 450° C.: $H_2SO_4+C \rightarrow CO+SO_2+H_2O$ A process of activated coke (carbon) catalytic reduction denitration is as follows.
$4NO+4NH_3+O_2 \rightarrow 3N_2+6H_2O$
$6NO+4NH_3 \rightarrow 5N_2+6H_2O$
$2NO_2+4NH_3+O_2 \rightarrow 3N_2+6H_2O$
$6NO_2+8NH_3 \rightarrow 7N_2+12H_2O$ In order to solve the problems existing in the related art, the present disclosure provides a method for desulphurizating and denitrating a flue gas in an integrated manner based on low-temperature adsorption, which is capable of simultaneously adsorbing $SO_2$ and $NO_x$ (i.e., NO and/or $NO_2$) and removing them from the flue gas in an environment having a temperature lower than the room temperature.

In an embodiment, the method for desulphurizating and denitrating the flue gas in the integrated manner based on the low-temperature adsorption includes: decreasing a temperature of the flue gas below a room temperature by using a flue gas cooling system; removing moisture in the flue gas by using a dehumidification system; sending the flue gas to a $SO_2$ and $NO_x$ adsorbing column system; and simultaneously adsorbing $SO_2$ and $NO_x$ of the flue gas with a material of activated coke, activated carbon, a molecular sieve or diatom mud in the $SO_2$ and $NO_x$ adsorbing column system to implement an integration of desulphurization and denitration of the flue gas based on the low-temperature adsorption.

In an embodiment, NO is oxidized to $NO_2$ by the activated coke, the activated carbon, the molecular sieve or the diatom mud at a low temperature, and $NO_2$ is adsorbed.

In an embodiment, the temperature of the flue gas is decreased to a range of −100° C. to 25° C. by the flue gas cooling system.

In an embodiment, the method further includes: heating or vacuumizing the activated coke, the activated carbon, the molecular sieves or the diatom mud adsorbed with $SO_2$ and $NO_x$, to regenerate and recycle the activated coke, the activated carbon, the molecular sieve or the diatom mud, and to desorb and recycle $SO_2$ and $NO_x$.

In an embodiment, the heating is performed at a temperature of 100° C. to 350° C.

In an embodiment, the material of activated coke, activated carbon, a molecular sieve or diatom mud is in a form of particles with a size of 30 to 40 mesh.

The present disclosure has the following beneficial effects.

In the method of present disclosure, the desulphurization and the denitration of the flue gas based on the low-temperature adsorption are integrated. The temperature of the flue gas is decreased below the room temperature by the flue gas cooling system, the moisture contained in the flue gas is removed by using the dehumidification system, and $SO_2$ and $NO_x$ contained in the flue gas are adsorbed by the material of the activated coke, the activated carbon, the molecular sieve or the diatom mud in the $SO_2$ and $NO_x$ adsorbing column system to simultaneously adsorb $SO_2$ and $NO_x$ and remove them from the flue gas in an environment having a temperature lower than the room temperature. It should be noted that, an adsorption capacity for $SO_2$ at a low temperature is much higher than an adsorption capacity at a high temperature. The flue gas is desulphurized after the temperature of the flue gas is decreased below the room temperature, which greatly reduces an adsorbent loading and a size of the adsorbing column. Further, $NO_x$ may be efficiently adsorbed and removed at a low temperature, and cannot be effectively adsorbed and removed at the room temperature or higher. In this case, by decreasing the temperature of the flue gas below the room temperature, the $NO_x$ adsorption and the flue gas denitration are improved. In addition, it should be noted that the present disclosure provides adsorbing and removing $SO_2$ and $NO_x$ simultaneously at the same temperature and in the same device, and thus can be widely applied to a flue gas containing $SO_2$ and $NO_x$, for example obtained from coal-burning, such as a power plant flue gas, a steel plant flue gas, or a coke oven flue gas.

Furthermore, the adsorbent may be regenerated by heating at a temperature of 100° C. to 350° C. or vacuum sucking. This regeneration temperature is lower than that of a conventional activated coke dry desulphurization and denitration regeneration process. In the present disclosure, the activated coke does not participate in the regeneration reaction, and thus the loss is low.

The present disclosure is further described with reference to the drawings.

As shown in FIG. 1, a method for desulphurizating and denitrating a flue gas in an integrated manner based on low-temperature adsorption provided in an embodiment of the present disclosure includes the following steps.

A temperature of a flue gas containing $SO_2$ and $NO_x$ is decreased below room temperature by using a flue gas cooling system 1, a part of a water vapour in the flue gas may be removed by condensation. A moisture content of the flue gas will not be higher than a saturated moisture content at the cooling temperature. The cooled flue gas flows through a $SO_2$ and $NO_x$ adsorbing column system 2, where $SO_2$ and $NO_x$ are adsorbed by activated coke, activated carbon, molecular sieves or diatom mud and thus are removed from the flue gas. The low-temperature flue gas after desulphurization and denitration is discharged after cold energy recovery. $SO_2$ and $NO_x$ adsorbed by the adsorbent are desorbed by heating regeneration or vacuum sucking regeneration, and are recycled. The adsorbent may be recycled after regeneration.

Example 1

Figure 4:
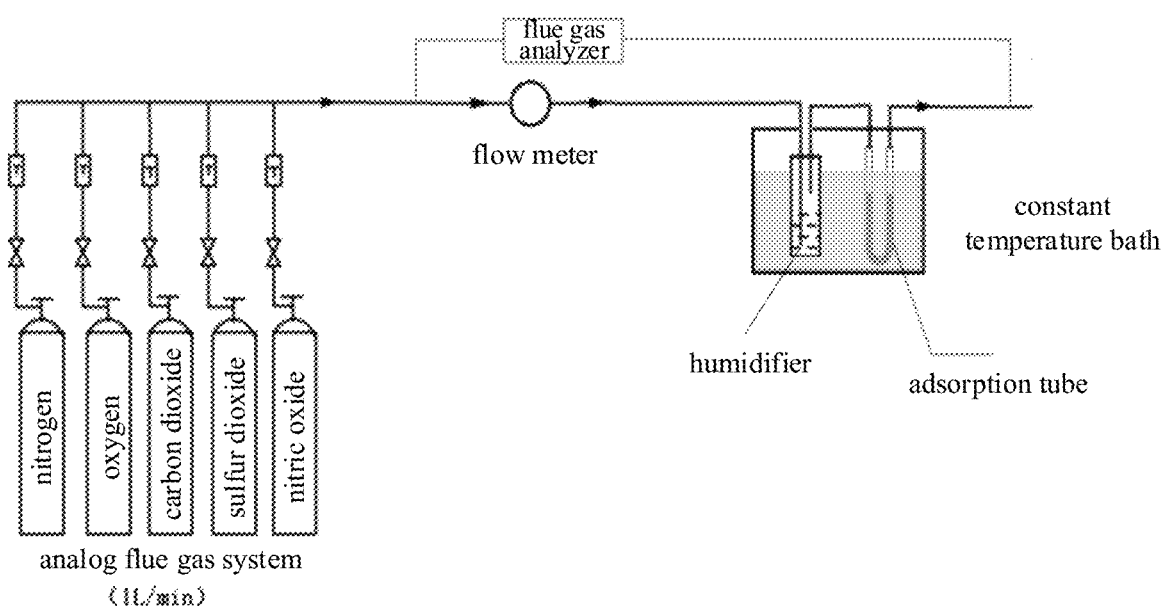
FIG. 4 is a schematic diagram showing an experimental device of Example 1, Example 2 and Comparative Example.

As shown in FIG. 4, an analog flue gas includes $SO_2$ of 3000 mg/$Nm^3$, $NO_x$ of 500 mg/$Nm^3$, $CO_2$ of 12%, and 02 of 6%. A flow rate of the analog flue gas is 1 L/min.

The analog flue gas containing $SO_2$ and $NO_x$ is humidified by a gas-washing bottle filled with 30% calcium chloride solution as a humidifier, and the gas-washing bottle is placed in a constant temperature bath at −20° C., and thus a moisture content of the flue gas is a saturated humidity at this temperature. After the flue gas has been introduced for a period of time, pollutant composition at an inlet of the gas-washing bottle is the same as that at an outlet of the gas-washing bottle, the low-temperature flue gas with the saturated humidity is introduced into an adsorption tube. The adsorption tube is filled with 5 g activated carbon particles with a size of 30 to 40 mesh. Contents of $SO_2$ and $NO_x$ contained in the flue gas after passing through the activated carbon bed are detected by a flue gas analyzer, and saturated adsorption capacities calculated from breakthrough curves (i.e., penetration time curves) of $SO_2$ and $NO_x$ are shown in Table 1.

Example 2

In Example 2, a constant temperature bath is controlled at 0° C., and other operations are the same as those in Example 1.

Comparative Example

In the Comparative Example, a constant temperature bath is controlled at 100° C. while the desulfurization and the denitration are carried out, and other operations are the same as those in Example 1.

Table 1 shows penetration times and effective adsorption amounts of $SO_2$ and $NO_x$ in the above inventive examples and the comparative example.

TABLE 1

|  | Example 1 | Example 2 | Comparative Example |
|---|---|---|---|
| adsorption temperature | −20° C. | 0° C. | 100° C. |
| $SO_2$ penetration time | 300 min | 145 min | 37 min |
| effective adsorption amount for $SO_2$ | 180 mg/g | 87 mg/g | 22 mg/g |
| $NO_x$ penetration time | 800 min | 230 min | 0 |
| effective adsorption amount for $NO_x$ | 96 mg/g | 27.6 mg/g | 0 |

An effective adsorption amount refers to an adsorption amount before $SO_2$ or $NO_x$ does not penetrate the adsorbent. The above results of the inventive examples and the comparative example in table 1 show that: a) the adsorption amount of $SO_2$ at −20° C. is about 8 times that at 100° C., and thus a better $SO_2$ adsorption effect may be achieved at a low temperature; b) $NO_x$ may be effectively adsorbed and removed at low temperature, but $NO_x$ penetrates the bed instantly at a high temperature and cannot be adsorbed and removed, which needs to be reduced by injecting ammonia. Therefore, the method of desulphurizating and denitrating the flue gas in the integrated manner based on the low-temperature adsorption of the present disclosure is more advantageous than conventional adsorption desulphurization methods.

What is claimed is:

1. A method for desulphurizating and denitrating a flue gas in an integrated manner based on low-temperature adsorption, comprising:

decreasing a temperature of the flue gas below a room temperature by using a flue gas cooling system (1);

removing moisture in the flue gas by using a dehumidification system;

sending the flue gas to a $SO_2$ and $NO_x$ adsorbing column system (2); and simultaneously adsorbing $SO_2$ and $NO_x$ of the flue gas with a material of activated coke, activated carbon, a molecular sieve or diatom mud in the $SO_2$ and $NO_x$ adsorbing column system (2) to implement an integration of desulphurization and denitration of the flue gas based on the low-temperature adsorption.

2. The method according to claim 1, wherein NO is oxidized to $NO_2$ by the activated coke, the activated carbon, the molecular sieve or the diatom mud at a low temperature, and $NO_2$ is adsorbed.

3. The method according to claim 1, wherein the temperature of the flue gas is decreased to a range of −100° C. to 25° C. by the flue gas cooling system (1).

4. The method according to claim 1, further comprising:

heating or vacuumizing the activated coke, the activated carbon, the molecular sieve or the diatom mud adsorbed with $SO_2$ and $NO_x$, to regenerate and recycle the activated coke, the activated carbon, the molecular sieve or the diatom mud, and to desorb and recycle $SO_2$ and $NO_x$.

5. The method according to claim 4, wherein the heating is performed at a temperature of 100° C. to 350° C.

6. The method according to claim 1, wherein the material of activated coke, activated carbon, a molecular sieve or diatom mud is in a form of particles with a size of 30 to 40 mesh.

* * * * *